US009518841B2

(12) United States Patent
Tilly et al.

(10) Patent No.: US 9,518,841 B2
(45) Date of Patent: Dec. 13, 2016

(54) DEVICE FOR TRANSMITTING MOVEMENT TO A POSITION SENSER AND CORRESPONDING DEVICE FOR SENSING POSITION

(71) Applicant: SAGEM DEFENSE SECURITE, Boulogne-billancourt (FR)

(72) Inventors: Bruno Tilly, Boulogne-Billancourt (FR); Nicolas Ravoux, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 15/022,795

(22) PCT Filed: Sep. 22, 2014

(86) PCT No.: PCT/EP2014/070143
§ 371 (c)(1),
(2) Date: Mar. 17, 2016

(87) PCT Pub. No.: WO2015/040216
PCT Pub. Date: Mar. 26, 2015

(65) Prior Publication Data
US 2016/0209238 A1 Jul. 21, 2016

Related U.S. Application Data

(60) Provisional application No. 61/881,133, filed on Sep. 23, 2013.

(30) Foreign Application Priority Data

Sep. 27, 2013 (FR) ...................... 13 59351

(51) Int. Cl.
*G01D 5/14* (2006.01)
*F16H 55/18* (2006.01)
*G01D 5/04* (2006.01)

(52) U.S. Cl.
CPC ................ *G01D 5/14* (2013.01); *F16H 55/18* (2013.01); *G01D 5/04* (2013.01); *G01D 5/145* (2013.01)

(58) Field of Classification Search
CPC ............ G01D 5/14; G01D 5/04; G01D 5/145; F16H 55/18; F16H 2055/18
See application file for complete search history.

(56) References Cited

U.S. PATENT DOCUMENTS 4,739,670 A * 4/1988 Tomita .................... F16H 55/18
74/409
5,771,745 A * 6/1998 Goette ................ F16H 57/0006
74/440

(Continued)

FOREIGN PATENT DOCUMENTS

JP 2006-077786 A 3/2006
JP 2010-151262 A 7/2010

*Primary Examiner* — Jermele M Hollington
*Assistant Examiner* — Dustin Dickinson
(74) *Attorney, Agent, or Firm* — Muncy, Geissler, Olds & Lowe, P.C.

(57) ABSTRACT

Device for transmitting movement to a toothed element forming an input of a position sensor, the transmission device including an output shaft, a first toothed sector rotatably linked to the output shaft and a second toothed sector mounted coaxially to the first toothed sector in order to have an angular displacement relative to the first toothed sector, a return member mounted between the toothed sectors returning the second toothed sector into a predetermined position, characterised in that the return member is arranged such as to magnetically generate a force tending to move the second toothed sector into the predetermined position.

8 Claims, 5 Drawing Sheets

(56) References Cited

U.S. PATENT DOCUMENTS 7,765,702 B2 * 8/2010 Schirp ................ B62D 15/0215
33/1 N
2009/0146650 A1 6/2009 Hatanaka et al.

* cited by examiner

DEVICE FOR TRANSMITTING MOVEMENT TO A POSITION SENSER AND CORRESPONDING DEVICE FOR SENSING POSITION

BACKGROUND OF THE INVENTION

Field of the Invention

The present invention relates to the field of position detection and, specifically, to a device for transmitting movement to a position sensor and to a position-detection device including such a transmission device.

Brief Discussion of the Related Art

In the field of aeronautics, it is known to detect the position of flight-control instruments, such as a control stick, by means of position sensors comprising an input formed by a toothed element. A movement-transmission device is mounted between the toothed element and the control instrument such that a predetermined movement of the flight-control instrument causes a corresponding movement of the toothed element. In the case of a pivotably mounted control instrument, the transmission device includes, for example, an input shaft rotatably linked to the instrument and to an output shaft supporting a toothed sector meshing with a toothed pinion forming the input of the position sensor.

Due to high-precision control requirements, the presence of play in the transmission of movement between the toothed sector and the toothed element is not acceptable. Said problem has been solved by splitting the toothed sector into a first toothed sector rotatably linked to the output shaft and a second toothed sector mounted coaxially to the first toothed sector in order to have an angular displacement relative to the first toothed sector. Return springs are mounted between the toothed sectors in order to return the second toothed sector into a predetermined position such that the tooth of the engaged toothed element is clamped between two teeth each belonging to one of the toothed sectors. The return springs are sized such that the tangential force to be transmitted to the toothed element is smaller than the return force. Thus, there is no play between the toothed sectors and the toothed element.

However, the risk exists that one of the springs may break, that pieces may come loose and affect the operation of surrounding devices, such as other position sensors. The springs are attached to the toothed sectors by means of hook portions: in order to prevent the hooks from breaking and pieces from coming loose, it has been foreseen to cover said portions with a resin. In order to prevent the turns from coming loose, it is known to insert a core in the springs. Said solutions make it possible effectively to remove the aforementioned risk, but the implementation thereof requires manual operations that make it more expensive to manufacture the transmission device.

The second toothed sector is usually retained on the first toothed sector by an axial abutment attached to the first toothed sector by screws. It is important that said screws do not come loose in order to ensure the firmness of the axial abutment and to prevent one of said screws from coming out and affecting the operation of the surrounding devices. Since said screws have a small diameter, the only known means for preventing the loosening of screws is to glue them. When performed manually, said operation also increases the cost of manufacturing the device.

BRIEF SUMMARY OF THE INVENTION

One aim of the invention is to provide a transmission device that is reliable while being inexpensive.

For this purpose, the invention provides a device for transmitting movement to a toothed element forming an input of a position sensor. The transmission device includes an output shaft, a first toothed sector rotatably linked to the output shaft and a second toothed sector mounted coaxially to the first toothed sector in order to have an angular displacement relative to the first toothed sector. A return member is mounted between the toothed sectors in order to return the second toothed sector into a predetermined position. The return member is arranged such as to magnetically generate a force that tends to move the second toothed sector into the predetermined position.

Thus, the return member does not include any elements connecting the toothed sectors when mechanically biased. The return member is thus only slightly subject to wear and fatigue, such that the risk of it breaking is low.

The force is preferably an attraction force.

Said attraction force has the effects of moving the second sector in the angular position thereof and of moving the sectors closer to one another axially, making it easier to handle same during production and to retain same in position once mounted.

Advantageously, the return member includes magnets each received in an open recess in a surface of one of the toothed sectors in order to be facing the other one of the toothed sectors.

Each recess of each one of the toothed sectors receives a magnet in the opening thereof that faces the other one of the toothed sectors so that, even if the attachment of the magnet is faulty, the magnet cannot come out of the recess thereof.

Preferably, the first toothed sector includes a hub having one free end provided with laterally projecting lugs and the second toothed sector includes a recess provided with axial grooves such that the hub is pivotably inserted in the recess with the lugs extending out of the recess such as to form axial abutments that prevent a separation of the toothed sectors when the second toothed sector is in a predetermined angular range relative to the first toothed sector, the predetermined return position being located within the predetermined angular range.

The assembly of the first toothed sector on the first toothed sector is thus obtained by a bayonet link, without requiring the addition of a screwed axial abutment. The risk of detachment of parts is thus limited.

The invention also relates to a position-detection device including such a movement-transmission device.

Further characteristics and advantages of the invention will emerge from reading the following description of non-limiting, specific embodiments of the invention.

BRIEF DESCRIPTION OF THE DRAWINGS

Reference is made to the appended figures, wherein.

DETAILED DISCUSSION OF THE PREFERRED EMBODIMENTS

Figure 1:
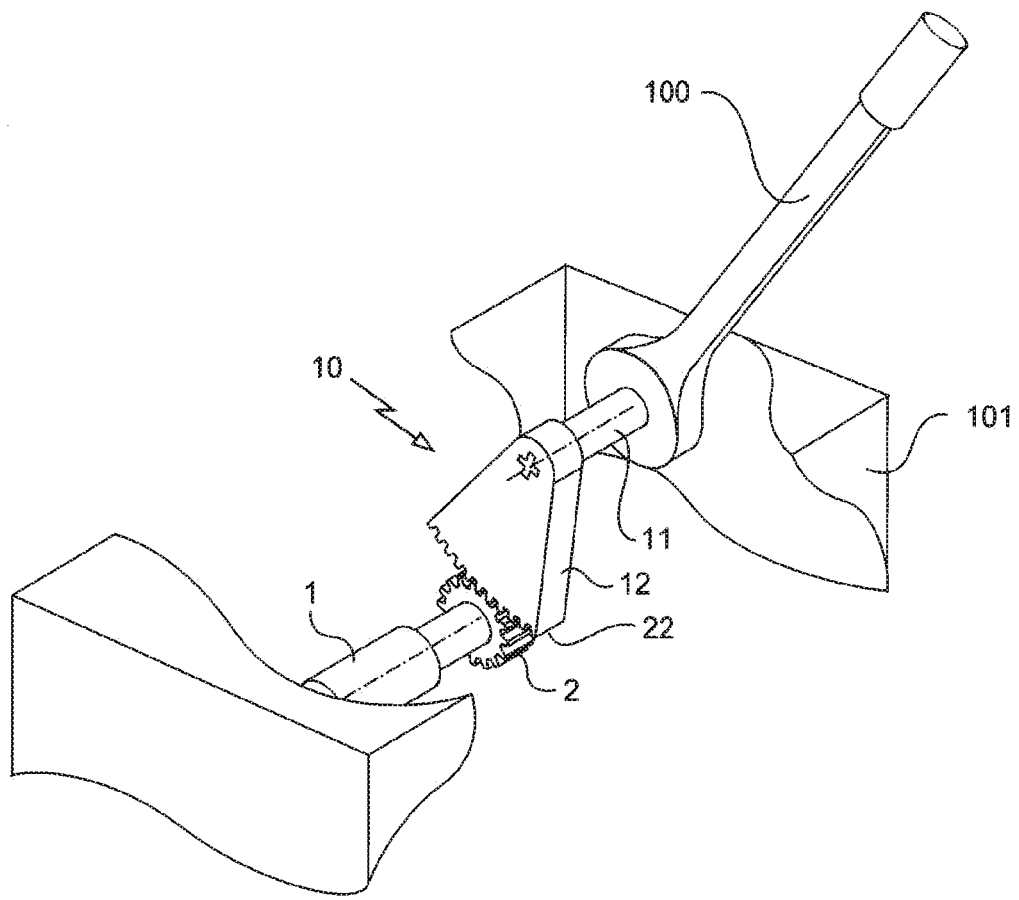
FIG. 1 is a diagrammatic perspective view of a detection device according to the invention.
Figure 2:
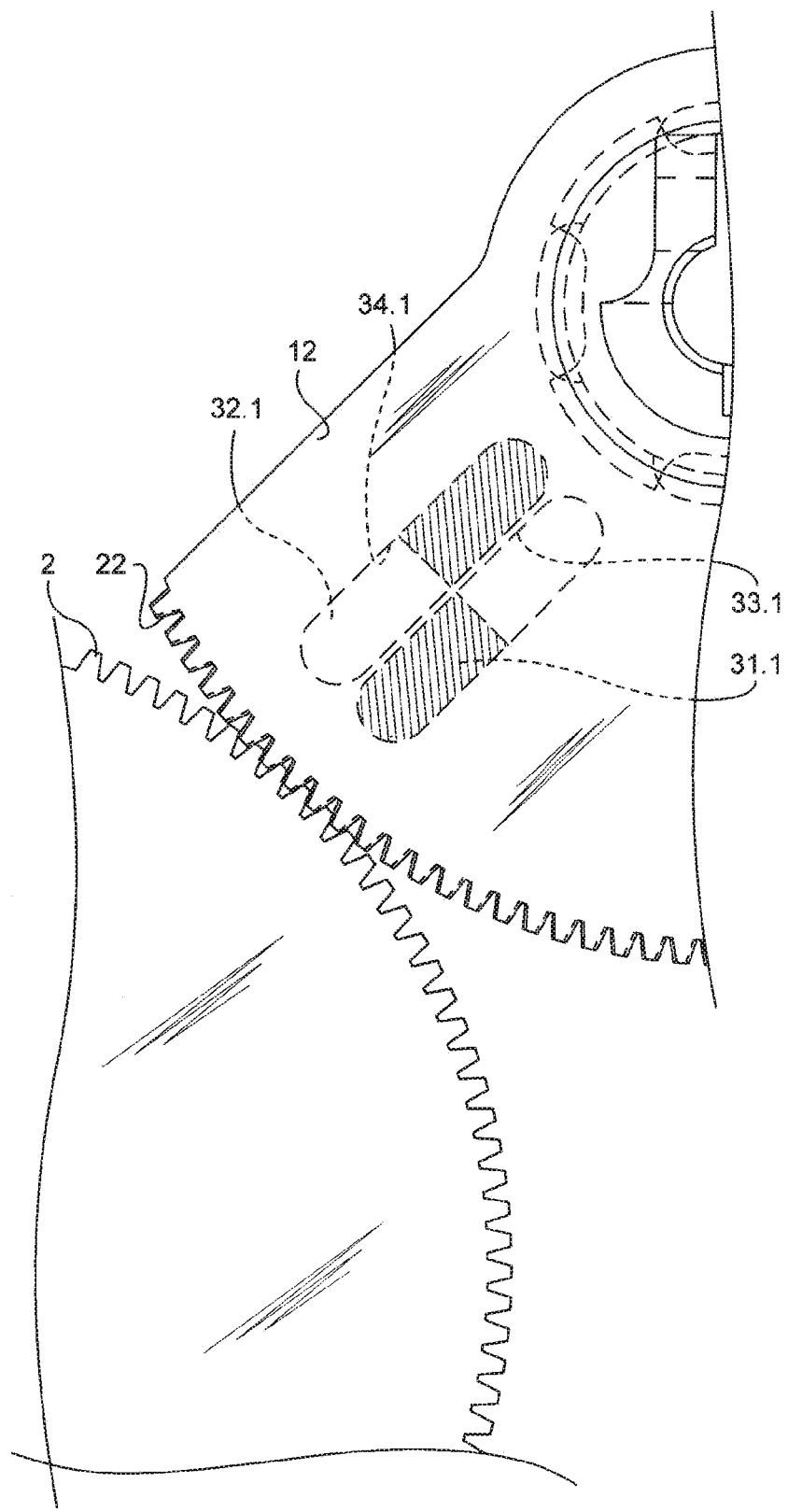
FIG. 2 is a partial diagrammatic plan view of the transmission device, with transparencies.
Figure 3:
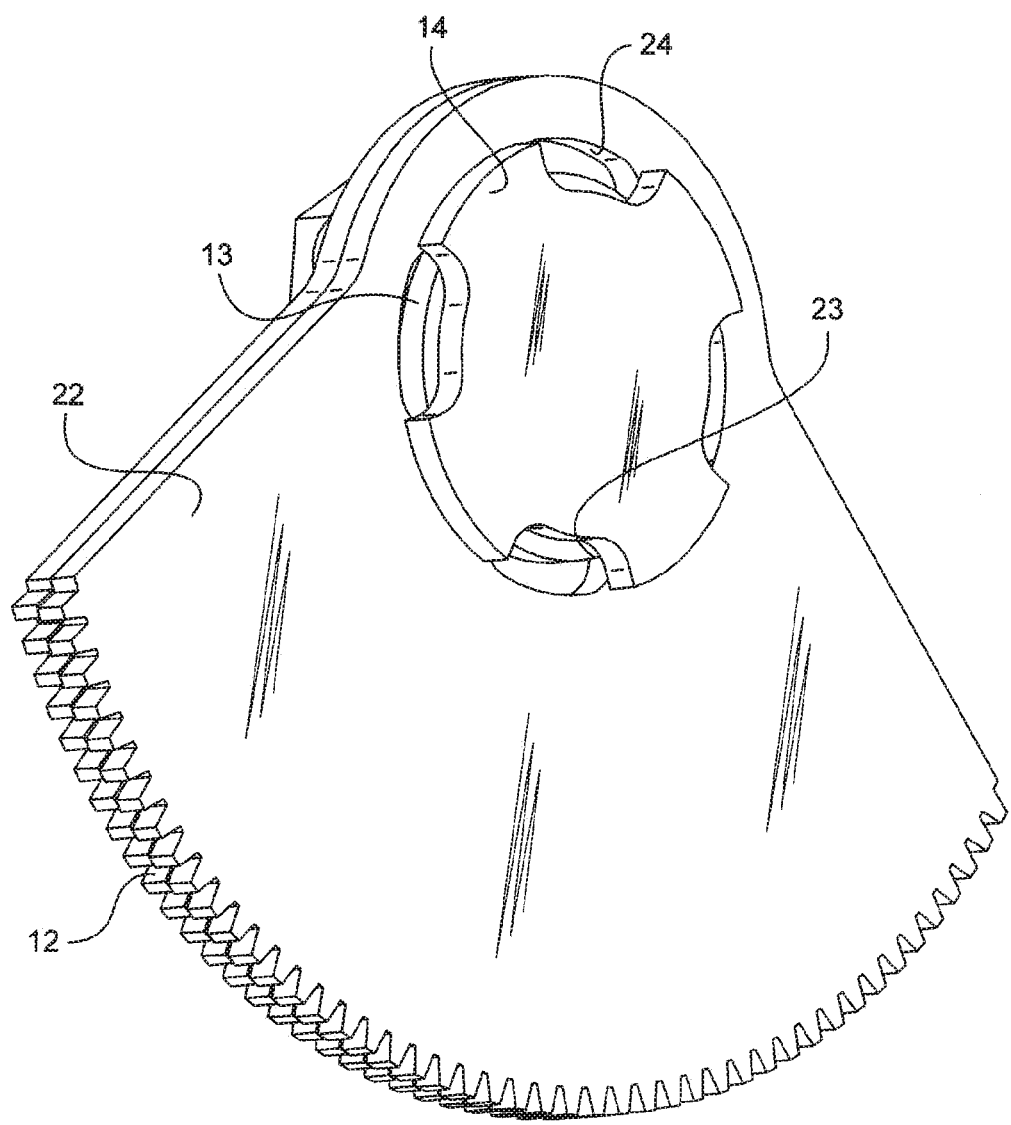
FIG. 3 is a diagrammatic perspective view of said transmission device.
Figure 4:
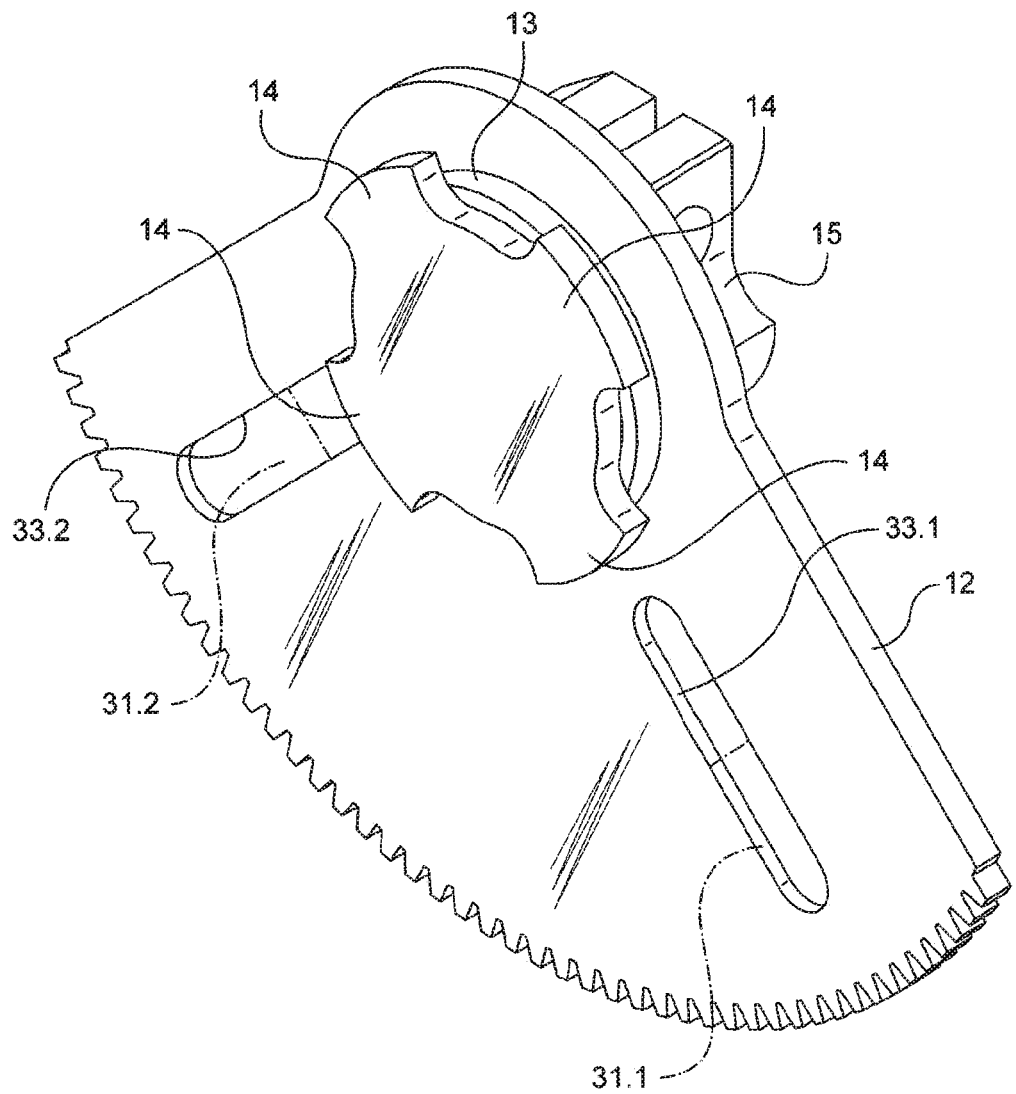
FIG. 4 is a diagrammatic perspective view showing the first toothed sector.
Figure 5:
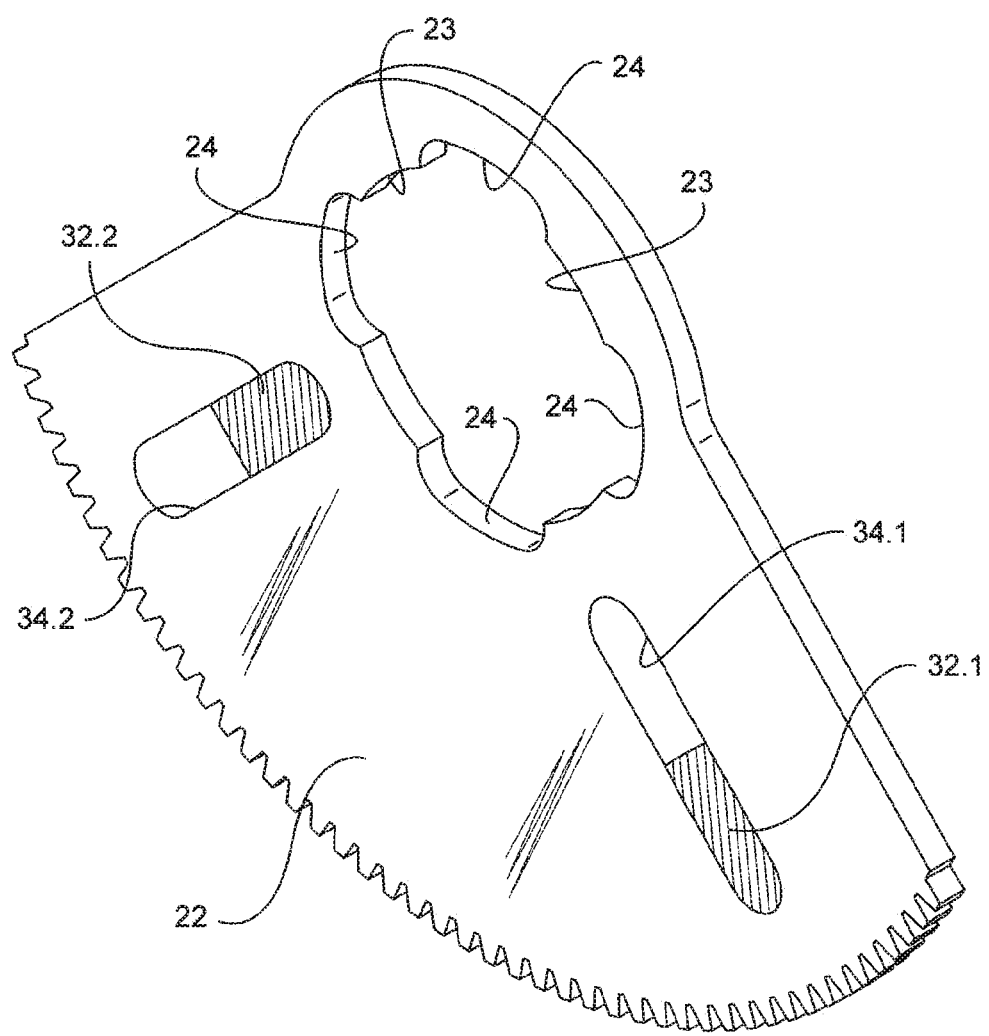
FIG. 5 is a diagrammatic perspective view showing the second toothed sector.

The detection device according to the invention is described herein when used for detecting the position of a flight-control instrument of an aircraft. The control instrument is, for example, intended for controlling the movements of the aircraft according to at least one axis. The control instrument herein is in the shape of a lever 100 pivotably mounted on a frame 101 secured to the structure of the aircraft and positioned in the flight deck thereof.

In reference to the figures, the detection device includes a position sensor 1 connected via a device, generally designated as 10, for transmitting movement to the lever 100 forming the control instrument.

The position sensor 1 here is of the RVDT type and has, in an intrinsically known manner, an input made up of a toothed element and, more precisely herein, of a pinion 2.

The transmission device 10 has an input arranged such as to be rotatably linked to the lever 100. The input here is a shaft 11 rigidly linked to the lever 100. It is obvious that the input of the transmission device can be linked to the lever 100 by any movement-transmission means, such as clamping, gears, a rotating slider crank or others.

The shaft 11 herein forms both an input and an output shaft of the transmission device 10.

The transmission device 10 also includes a first toothed sector 12 and a second toothed sector 22 meshing with the pinion 2.

The first toothed sector 12 is rotatably linked to the shaft 11 via an adapter sleeve 15 which is secured to the first toothed sector 12. Le first toothed sector 12 includes, coaxially to the adapter sleeve 14 on one side of the first toothed sector 12 opposite said sleeve, a hub 13 having a free end provided with lugs 14 projecting sidewise towards the outside. Four lugs 14 are provided herein, arranged at 90° from one another.

The second toothed sector 22 is mounted coaxially to the first toothed sector 12 in order to have an angular displacement relative to the first toothed sector 12. The second toothed sector 22 includes a recess 23 provided with axial grooves 24 enabling the engagement of the hub 13 and the lugs 14. Four axial grooves 24 are provided herein, arranged at 90° from one another. The recess 23 is shorter than the length of the hub 13 such that, when the hub 13 is received in the recess 23, the lugs 14 are outside the recess 23. It is understood that when the lugs 14 are positioned aligned with the axial grooves 24, the hub 13 can be inserted axially in the recess 24 and removed from same. On the other hand, when the hub 13 is received in the recess 23 and the lugs 14 are not aligned with the axial grooves 24, the recess 23 can pivot about the hub 13 in an angular range such that the lugs 14 form axial abutments that prevent the hub 13 from coming out of the recess 23 and thus the toothed sectors 12, 22 from separating from one another.

The transmission device also includes a return member which is mounted between the toothed sectors 12, 22 and which is arranged such as to magnetically generate a force that tends to move the second toothed sector 22 towards a predetermined angular position relative to the first toothed sector 12.1 The return force herein is an attraction force. The predetermined return position is within the predetermined angular range mentioned above.

The return member includes a first pair of magnets 31.1, 31.2 mounted on the first toothed sector 12 and a second pair of magnets 32.1, 32.2 mounted on the second toothed sector 22. The magnets 31.1, 31.2 are separated by a distance equal to the distance separating the magnets 32.1, 32.2.

The magnets are positioned such that:
the first magnet 31.1 of the first pair of magnets and the first magnet 32.1 of the second pair of magnets have interacting fields when the second toothed sector is in the vicinity of the predetermined return position;
the second magnet 31.2 of the first pair of magnets and the second magnet 32.2 of the second pair of magnets have interacting fields when the second toothed sector is adjacent to the predetermined return position.

The magnets 31.1, 31.2 are each received in a recess 33.1, 33.2 which is open on a surface 35 of the first toothed sector 12 in order to be facing the second toothed sector 22.

The magnets 32.1, 32.2 are each received in a recess 34.1, 34.2 which is open on a surface 36 of the second toothed sector 22 in order to be facing the first toothed sector 12.

The magnets 31.1, 31.2, 32.1, 32.2 are polarised according to an axis extending in a radial plane of the first toothed sector 12 and of the second toothed sector 22, respectively. Specifically, the polarisation axis extends according to a radius of the toothed sectors 12, 22: the magnet 31.1 having the opposite polarity to that of the magnet 32.1 and the magnet 31.2 having the opposite polarity to that of the magnet 32.2.

Thus, the first magnet 31.1 of the first pair of magnets attracts the first magnet 32.1 of the second pair of magnets, and the second magnet 31.2 of the first pair of magnets attracts the second magnet 32.2 of the second pair of magnets in the same pivoting direction such that the second toothed sector 22 is attracted towards the predetermined angular position which corresponds to the position in which the magnets 31.1, 31.2 are facing the magnets 32.1, 32.2, respectively.

In said predetermined position, the teeth of the first toothed sector 12 are aligned with the teeth of the second toothed sector 22. The predetermined return position is defined in accordance with:
the tooth cutting tolerances,
the magnet positioning tolerances,
the return force obtained by means of the magnets.

For example, it is desirable for the relative movement of the toothed sectors to make it possible to compensate for a play of between one quarter of a tooth and half a tooth.

The return force provided by the magnets must be greater than the greater value among:
the force resulting from the torque to be transmitted to the pinion 2, and
parasitic forces likely to separate the teeth (for example caused by accelerations and/or vibrations).

For the assembly, the second toothed sector 22 is separated from the predetermined position and the pinion 2 is meshed with the toothed sectors 12, 22 such that the tooth engaged by the pinion 2 is clamped between two adjacent teeth each belonging to one of the toothed sectors 12, 22.

The invention is obviously not limited to the described embodiments, and instead includes all other alternative embodiments that fall within the scope of the invention as defined by the claims.

The detection device can include a plurality of sensors and devices for transmitting movement.

The sensor can be of a different type and the input thereof can, for example, be a translatably movable toothed element.

The magnets can be mounted such as to exert a repulsive force therebetween that centres the second toothed sector relative to the first toothed sector. The magnets can be mounted such that the magnets of one of the two pairs of magnets extend between the magnets of the other one of the two pairs of magnets.

The number of magnets may be other than four and depends, in particular, on the return force to be exerted and on the size. The return member can thus include one magnet secured to a toothed sector and one magnet or a ferromagnetic portion secured to the second toothed sector, or vice-versa.

The toothed sectors can extend over an angle of up to 360 degrees.

The number of lugs and axial grooves, the same as the dimensions thereof, can be modified in accordance with the needs and, in particular, with the angular displacement range of the angular sectors relative to one another.

The invention can be used in any application that requires precisely knowing the position of a mobile element.

The invention claimed is:

1. A device for transmitting movement to a toothed element forming an input of a position sensor, the transmission device including an output shaft, a first toothed sector rotatably linked to the output shaft and a second toothed sector mounted coaxially to the first toothed sector in order to have an angular displacement relative to the first toothed sector, a return member mounted between the toothed sectors returning the second toothed sector into a predetermined position, characterised in that the return member is arranged such as to magnetically generate a force tending to move the second toothed sector into the predetermined position and in that the return member includes magnets polarised according to an axis extending in a radial plane of the toothed sector.

2. The device according to claim 1, wherein the force is an attraction force.

3. The device according to claim 1, wherein the magnets are each received in a recess open in a surface of one of the toothed sectors in order to face the other one of the toothed sectors.

4. The device according to claim 1, wherein the polarisation axis extends according to a radius of the toothed sectors.

5. The device according to claim 1, wherein the return member includes a first pair of magnets mounted on the first toothed sector and a second pair of magnets mounted on the second toothed sector, a first magnet of the first pair of magnets and a first magnet of the second pair of magnets having interacting fields, and a second magnet of the first pair of magnets and a second magnet of the second pair of magnets having interacting fields.

6. The device according to claim 5, wherein the first magnet of the first pair of magnets attracts the first magnet of the second pair of magnets, and the second magnet of the first pair of magnets attracts the second magnet of the second pair of magnets.

7. The device according to claim 1, wherein the first toothed sector includes a hub having one free end provided with lugs projecting sidewise and the second toothed sector includes a recess provided with axial grooves such that the hub is pivotably inserted in the recess with the lugs extending out of the recess such as to form axial abutments that prevent a separation of the toothed sectors when the second toothed sector is in a predetermined angular range relative to the first toothed sector, the predetermined return position being located within the predetermined angular range.

8. A device for detecting the position of a mobile member, including a position sensor having an input formed by a toothed element engaged with toothed sectors supported by an output shaft of a transmission device having an input arranged such as to be connected to the mobile member, the transmission device being in accordance with claim 1.

* * * * *